US012182504B2

(12) United States Patent
Jose et al.

(10) Patent No.: US 12,182,504 B2
(45) Date of Patent: Dec. 31, 2024

(54) DYNAMIC FILLABLE FORM RENDERING ENGINE UTILIZING COMPILATIONLESS MODIFICATIONS

(71) Applicant: ALLSTATE INSURANCE COMPANY, Northbrook, IL (US)

(72) Inventors: Cijo Mathew Jose, Northbrook, IL (US); Adam Michael Kalbasz, Northbrook, IL (US); Selvam Babu Selva Thambi, Northbrook, IL (US); Sasisudhan Manian Arjunan, Northbrook, IL (US); Yufeng Deng, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/536,416

(22) Filed: Nov. 29, 2021

(65) Prior Publication Data

US 2023/0169263 A1 Jun. 1, 2023

(51) Int. Cl.
*G06F 40/174* (2020.01)
*G06F 9/54* (2006.01)
*G06F 16/93* (2019.01)
*G06F 40/12* (2020.01)
*G06N 20/00* (2019.01)

(52) U.S. Cl.
CPC .......... *G06F 40/174* (2020.01); *G06F 9/541* (2013.01); *G06F 16/93* (2019.01); *G06F 40/12* (2020.01); *G06N 20/00* (2019.01)

(58) Field of Classification Search
CPC ........ G06F 40/12; G06F 40/174; G06F 16/93; G06F 9/541; G06N 20/00
See application file for complete search history.

(56) References Cited

U.S. PATENT DOCUMENTS

| 8,843,836 | B2 | 9/2014 | Driesner et al. |
| 9,419,884 | B1* | 8/2016 | Li .......................... H04L 43/50 |
| 10,671,806 | B2 | 6/2020 | Tsabba |
| 2007/0130511 | A1 | 6/2007 | Roberge et al. |
| 2017/0286389 | A1 | 10/2017 | Ceneviva et al. |
| 2018/0157987 | A1 | 6/2018 | Schmidtkaraca |
| 2019/0155894 | A1 | 5/2019 | Gandhi et al. |
| 2020/0065576 | A1* | 2/2020 | Padmanaban ........ G06V 30/412 |

(Continued)

OTHER PUBLICATIONS

5 APIs for Automating PDF Generation (https://nordicapis.com/5-apis-for-automating-pdf-generation/) Published Sep. 22, 2020 (14 pages).

(Continued)

*Primary Examiner* — Scott T Baderman
*Assistant Examiner* — Seung Woon Jung
(74) *Attorney, Agent, or Firm* — Dinsmore & Shohl LLP (57) ABSTRACT

Methods and systems for compilationless modification of a fillable form may include receiving a ruleset and generating a script file based upon the ruleset. The method may also include retrieving data from one or more data sources according to the script file and generating a data map file configured to provide a mapping of the retrieved stored data to the fillable form. The method may further include rendering the fillable form according to tagged fields populated with the retrieved stored data via the data map file, wherein the tagged fields correspond to fields in the data map file.

11 Claims, 5 Drawing Sheets

(56) References Cited

U.S. PATENT DOCUMENTS

| | | |
|---|---|---|
| 2020/0110792 A1 | 4/2020 | Tsabba |
| 2020/0110796 A1* | 4/2020 | Tsabba ..................... G06F 8/38 |
| 2020/0210513 A1* | 7/2020 | Evans ................... G06F 40/186 |
| 2020/0233877 A1* | 7/2020 | Patel ................... G06F 16/2282 |
| 2021/0149645 A1* | 5/2021 | Kang ................... H04L 67/306 |

OTHER PUBLICATIONS

International Search Report and Written Opinion for Appln. No. PCT/US2022/051087 mailed Mar. 16, 2023, 11 pages.
International Preliminary Report On Patentability for Appln. No. PCT/US2022/051087 issued May 2, 2024, 8 pages.
Amgraf et al: OneForm™ Designer Plus, Internet Citation, 2 pages.

* cited by examiner

DYNAMIC FILLABLE FORM RENDERING ENGINE UTILIZING COMPILATIONLESS MODIFICATIONS

TECHNICAL FIELD

The present specification generally relates to document management systems and methods and, more specifically, systems and methods for compilationless modification of dynamically fillable documents associated with a pre-compiled code, utilizing a generated script file that applies a ruleset, as well as utilizing a generated data map file to map the script file to a modified fillable document.

BACKGROUND

Fillable forms, such as portable document format (PDF) documents, allow users to enter information in various document fields. Fillable forms are often designed by form creators that add and modify document fields, such that the fillable forms are typically produced with dynamic data programmatically using a compiled language and document manipulation libraries. Changes in form structure or the data to be placed within fields requires a coding change, recompilation, and redeployment. A need exists to more efficiently and effectively streamline the modification of fillable forms.

SUMMARY

In accordance with one embodiment of the present disclosure, a compilationless fillable form modification system may include one or more processors, one or more memory components communicatively coupled to the one or more processors, and machine readable instructions stored in the one or more memory components. The memory components may cause the compilationless fillable form modification system to receive a ruleset comprising an update to a previous ruleset associated with a compiled code and generate a script file based upon the ruleset. The compilationless fillable form modification system may further include a processing engine communicatively coupled to the one or more processors and the one or more memory components. The processing engine may be configured to receive the script file, retrieve stored data from one or more data sources according to the script file, and generate a data map file configured to provide a mapping of the retrieved stored data to a fillable form, based upon the script file and the retrieved stored data. The compilationless fillable form modification system may further include a render engine communicatively coupled to the one or more processors and the one or more memory components. The render engine may be configured to access the data map file and render the fillable form according to tagged fields populated with the retrieved stored data via the data map file. The tagged fields may corresponding to fields in the data map file.

In accordance with another embodiment of the present disclosure, a compilationless fillable form modification system may include one or more processors, one or more memory components communicatively coupled to the one or more processors, and machine readable instructions stored in the one or more memory components. The memory components may cause the compilationless fillable form modification system to receive a ruleset comprising an update to a previous ruleset associated with a compiled code and generate a script file based upon the ruleset. The compilationless fillable form modification system may further include a processing engine communicatively coupled to the one or more processors and the one or more memory components. The processing engine may be configured to receive the script file, retrieve stored data from one or more data sources according to the script file, and generate a data map file. The data map file may provide a mapping of the retrieved stored data to a fillable form, based upon the script file and the retrieved stored data. The compilationless fillable form modification system may further include a render engine communicatively coupled to the one or more processors and the one or more memory components. The render engine may be configured to access the data map file and receive a tagged fillable form comprising tagged fields, wherein the rendered fillable form is based upon the tagged fillable form, the data map file, the one or more data sources, the script file, and the ruleset. The render engine may further render the fillable form according to the tagged fields populated with the retrieved stored data via the data map file, wherein the tagged fields correspond to fields in the data map file, and wherein the rendered fillable form is based upon the data map file, the one or more data sources, the script file, and the ruleset.

In accordance with another embodiment of the present disclosure, a compilationless modification of a fillable form method may include receiving a ruleset comprising an update to a previous ruleset associated with a compiled code, generating a script file based upon the ruleset, and retrieving data from one or more data sources according to the script file. The method may further include generating a data map file configured to provide a mapping of the retrieved stored data to the fillable form and rendering the fillable form according to tagged fields populated with the retrieved stored data via the data map file, wherein the tagged fields correspond to fields in the data map file.

Although the concepts of the present disclosure are described herein with primary reference to portable document format (PDF) documents, it is contemplated that the concepts enjoy applicability to any type of fillable document, including and not limited to formats such as XML Paper Specification (XPS), HyperText Markup Language (HTML), eXtensible Markup Language (XML), and electronic publication (EPUB).

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Fillable documents, such as portable document format (PDF) documents, may utilize fillable fields that provide a convenient way to enter, store, and retrieve field data. Fillable documents may also be customizably prepopulated, either by a user entering data in fields designed by a form creator, or populating such fields with data retrieved elsewhere. In this way, a form creator can create and edit a fillable form (such as a PDF) to be populated with data stored in a database or imported from elsewhere via an application programming interface (API). For example, a form creator can set up fields that will prepopulate the form with the contact information of the user completing form, as determined by the field characteristics and location within the form. Changes to the fillable form may then be made by the form creator as needed, in which various fields can be added, removed, and/or moved within the form. Fields may be edited in a variety of ways, such as placement location on the form, how the contents of the data are to be displayed within the fields, the size of the field, and the like. Stored data used to populate such fields, for example contact information of the document signer, can come from a variety of sources. However, PDFs are typically produced with dynamic data programmatically using a compiled language and PDF manipulation libraries. Changes in form structure or to the data to be inserted into fields can require a developer for the coding change to a pre-compiled code, recompilation of the changed code, and redeployment of the new recompiled code. This can add to the complexity for updating forms. Removing the need to recompile the pre-compiled code for the rendered PDF for subsequent changes can reduce the complexity for updating forms and make the process faster and more efficient.

In embodiments described herein, a compilationless fillable form modification system is configured to implement systems and methods to dynamically modify rendered fillable forms without recompiling code. Form creators may customize fillable fields within a fillable PDF form so that users can then enter and/or verify their information within the rendered fillable PDF form. Developers may specify rulesets applied to stored data that can be mapped to the customized fillable fields. In this way, the fillable fields managed by the form creator can then be filled with the stored data so that the fillable document may be rendered with the external data according to a specified ruleset.

Accordingly, systems and methods as provided herein provide for a compilationless fillable form modification system that uses a ruleset comprising an update to a previous ruleset associated with a compiled code to generate a script file that may be processed with stored data to create a data map that maps the stored data to a tagged fillable form to create a rendered fillable form. In embodiments, systems and methods as described herein may also update the ruleset, which may update the scripting file and the rendered fillable form without recompiling code. These and additional features will be described in greater detail below.

Figure 1:
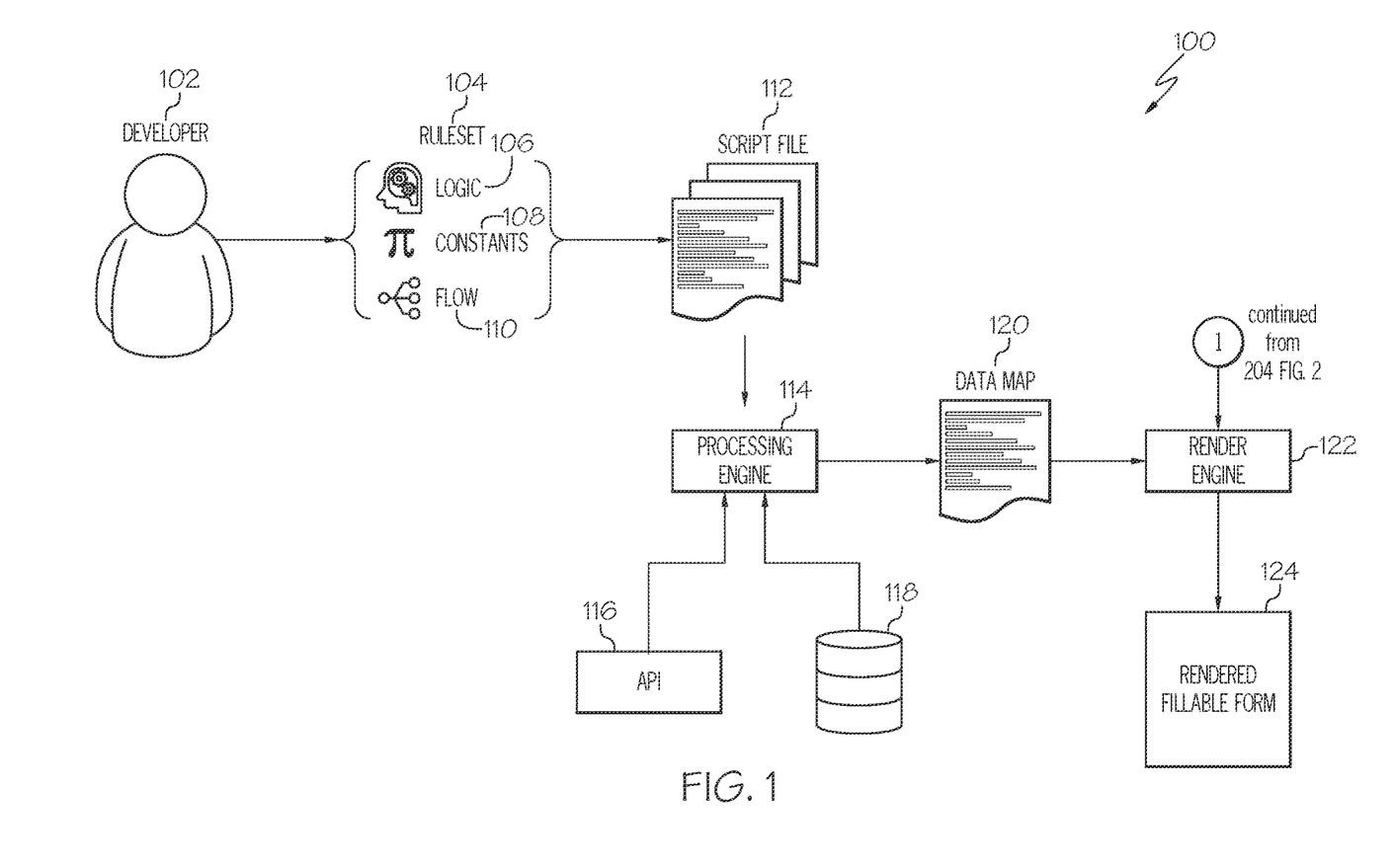
FIG. 1 depicts a developer process flow to generate a script file that applies a ruleset to dynamically retrieve data for a generated data map file, which maps data retrieved from data sources to a tagged fillable form to generate a modified rendering of the form, according to one or more embodiments shown and described herein.

Referring now to FIG. 1, in embodiments, a developer flow 100 for a developer 102 may include a ruleset 104, a script file 112, a processing engine 114, a data map file 120, a render engine 122, and a rendered fillable form 124. A developer 102 may be any type of software developer capable of utilizing one or more of the embodiments herein. The developer 102 may utilize a graphical user interface (GUI) or any other suitable interface (command line, and the like) to specify a ruleset 104 that includes logic rules 106, constants 108, and/or flow 110. Logic rules 106 may include any suitable type of programmatic logical operators such as AND, OR, NOT, XOR (i.e., exclusive OR) to create Boolean expressions and/or relational operators (equal to, not equal to, greater than, less than, greater than or equal to, less than or equal to and the like). For example, the zip code of a user can be stored/displayed as 5 digits OR 9 digits (i.e., logic in the form of a rule that governs a zip code field). Constants 108 may include any unchanging value. A constant, for example, may be a rule that the code for a state is two characters, which can govern how the state value is stored and/or displayed in the field. A flow 110 may be utilized for the sequencing of data and/or combining of data based on various sources, and writing the results to a destination. For example, a user's address can be retrieved with separate values in a database and then displayed as street address AND city AND state AND zip code. The ruleset may be stored in a file in any suitable location, such as a server.

A script file 112 may be generated as a sequence of instructions based upon the ruleset 104. In this embodiment, the script file may be proprietary and may be implemented in JavaScript Object Notation (JSON). In other embodiments, the script file may be freely-accessible (such as open source) and/or be implemented in any other suitable language and/or file format. As used herein, anything proprietary in the present embodiment may not be proprietary in other embodiments. Moreover, anything implemented in JSON herein may be utilized in any other suitable language and/or file type/format (YAML, Protobuf, Avro, MongoDB, OData, MessagePack, JavaScript, Python, and the like). As described in more detail below, the script file may serve as input to a processing engine 114. In some embodiments, version control may be utilized with the script file 112 to protect accidental changes to the script file 112 that would propagate to a rendered document. For example, a new script file 112 or different versions of the script file 112 may coexist to prevent inadvertent changes to the original or current script file 112.

The processing engine 114 may receive the script file 112 as input, such that stored data that may be obtained from any suitable source(s), such as an API 116 and/or a database 118. The processing engine may recognize updated script file 112 language, and for example, dump/remove the instructions associated with the previous script file, and thus load a new/updated ruleset 104 to use going forward. The processing engine 114 may utilize data obtained from an API 116, a database 118, both, and/or any other suitable source of data that can be accessed by the processing engine 114. The processing engine 114 may interface with any suitable type of API implementation such as a representational state transfer (REST) API (or any suitable alternative such as GraphQL and the like) may be utilized to access data from applications, databases, operating systems, the cloud or other remote location, and/or any other suitable location from which an API can retrieve data. The processing engine 114 may interface with any suitable type or implementation of database that is capable of storing and providing access to data. The database 118 may be, for example, a structured query language (SQL) database, a like database that may be associated with a relational database management system (RDBMS), or an object-relational database management system (ORDBMS). The database may be any other large-scale storage and retrieval mechanism including, but not limited to, a SQL, SQL-including, or a non-SQL database. For example, the database may utilize one or more big data storage computer architecture solutions. Such big data storage solutions may support large data sets in a hyperscale and/or distributed computing environment, which may, for example, include a variety of servers 220 (described further below) utilizing direct-attached storage (DAS). Such database environments may include Hadoop, NoSQL, and Cassandra that may be usable as analytics engines. Thus, while SQL may be referenced herein as an example database, it is understood that any other type of database capable of supporting large amounts of data, whether currently available or yet-to-be developed, and as understood to those of ordinary skill in the art, may be utilized.

The processing engine 114 also interfaces with the API 116 and/or database 118. By receiving the script file 112, the processing engine 114 may apply the ruleset 104 as defined by the developer 102 to the stored data obtained from the API 116 and/or database 118. For example, the ruleset 104 may apply to stored data pertaining to a user's date of birth and mailing address. The script file 112 then provides specific instructions to the processing engine 114 regarding the stored data that is being utilized by the ruleset 104 (e.g., date of birth and mailing address). In this embodiment, the stored data is not modified at its source (i.e., the location being accessed by the API 116 or within the database 118). In other embodiments, the stored data may be modified at its source by the processing engine 114.

The processing engine 114, once it has received the stored data (as specified by the script file 112, from the API 116 and/or database 118), generates or modifies a data map file 120 file. The data map file 120 provides the stored data for reference by tagged fields within a tagged form, as discussed in further detail below with respect to FIG. 2. More specifically, the data map file 120 may refer to the location of where the stored data is stored, which can thus provide current data at the time of request. In this embodiment, the data map file 120 may be a proprietary and implemented in JSON. In other embodiments, the data map file 120 may not be proprietary and/or may utilize any other suitable type of file, format, or the like. In some embodiments, the data map file 120 does not contain the requested stored data, but rather refers to where the data is stored. Continuing with the previous example, the location of the date of birth and address data may be referenced within the data map file 120, such that tagged data fields within a tagged fillable document may be mapped to refer to the location of the specific stored data as retrieved by the processing engine 114, as discussed in more detail below. In other embodiments, the data map file 120 may itself contain the requested stored data.

The data map file 120 may then be utilized as input for a render engine 122 to produce a rendered fillable form 124. The render engine 122 may complete the data map file 120 by utilizing the mapped relations between the stored data and the corresponding fillable tagged fields. As discussed in more detail below with respect to FIG. 2, the render engine receives as input a tagged fillable form with fillable fields tagged within the fillable form, along with the data map file 120. The render engine 122 may then request or otherwise obtain stored data corresponding to each requested tagged fillable field from the data map file 120. Once the corresponding stored data is received, the tagged fillable field may then be rendered with the stored data. Once all tagged fillable fields have been processed, the render engine 122 may output the rendered fillable form 124. In this embodiment, if any tagged fillable fields cannot be rendered (due to unavailable data, formatting problems, and the like), then rendered fillable form 124 may be rendered while omitting such fields that cannot be rendered. In another embodiment, the rendered fillable form 124 may not be displayed or otherwise rendered unless all tagged fillable fields are rendered. In a different embodiment, the rendered fillable form 124 will display all tagged fillable fields regardless of whether they display correctly and/or are provided with the corresponding stored data. In embodiments, the rendered fillable form is based upon the data map file 120, the one or more data sources, the script file 112, and the ruleset 104.

Figure 2:
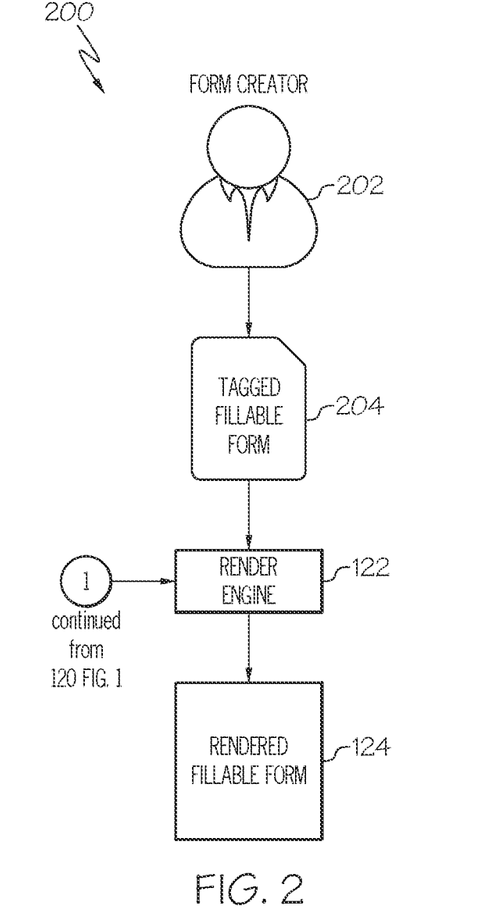
FIG. 2 depicts a form creator process flow to design a tagged fillable document to be dynamically rendered in relation to the developer process flow depicted in FIG. 1, according to one or more embodiments shown and described herein.

Referring now to FIG. 2, a form creator flow 200 shows a form creator 202 creating a tagged fillable form 204, such as a PDF. For example, the form creator may want to create a tagged fillable form 204 that utilizes tagged fillable fields. While some fields may be designated for completion by a user (such as for the user's signature, initials, or date of signature), other fields may be designated for prepopulation with data pertaining to the user. For example, a user may be provided with a life insurance policy document to sign electronically or in hardcopy. Rather than having a document with blanks to be manually completed by the user or another party regarding the user's information, these fields can be prepopulated.

Relating to the render engine 122 as discussed above with respect to FIG. 1, the tagged fillable fields are provided as input as part of the tagged fillable form 204. The render engine 122 then utilizes stored data corresponding to the tagged fields as specified by the data map file 120 to render tagged fields with stored data. The tagged fillable form 204 may have fillable fields designated to be populated with the stored data corresponding to the fillable fields. Once the data render engine 122 receives the stored data corresponding to the user's date of birth and address, this data may be rendered within the tagged fillable field as part of the rendered fillable form 124. In this embodiment, the rendered fillable form 124 has associated code compiled as part of the original creation. However, updating data in the tagged fillable fields does not require re-compilation of code to re-create the rendered fillable form 124. This is because changes defined by the ruleset, as to how the stored data is put into the tagged fillable form 204 by the render engine 122 provided to the data map file 120, are only reflected in the tagged fillable fields via the data map file 120, which can be conveniently updated via changes to the ruleset 104 as defined by the developer 102. The render engine 122 may be configured to receive the tagged fillable form 204 comprising the tagged fields. In embodiments, the ruleset 104 may be received from a first user, and the tagged fillable form 204 may be received from a second user that differs from the first user.

As discussed above with respect to FIGS. 1-2, a form creator 202 within the form creator flow 200 may want to create a rendered fillable form 124 that can be prepopulated with information for each user to which the rendered fillable form 124 applies. The rendered fillable form 124 may be based upon the tagged fillable form 204, the data map file 120, the one or more data sources, the script file 112, and the ruleset 104. The form creator 202 in FIG. 2 may specify that a user's address and date of birth should be rendered at a particular location on a rendered fillable form 124, so that this information need not be manually typed or written onto the form. The fillable fields being requested by the form creator 202 may be subject to the developer flow 100 depicted in FIG. 1. The developer 102 may have created one or more rulesets that apply to the fillable fields being utilized by the form creator 202. For example, the stored data corresponding to the user's date of birth and address may be stored in a format that needs to be changed for rendering on the rendered fillable form 124. While user addresses may be stored with an 80 character limit, for space purposes the rendered tagged fillable form 204 in this example may only render this data properly when the address is up to 40 characters. This may be because the remainder of a user's address beyond 40 characters may be cut off on the rendered fillable form 124 and/or may display (for example) 70 characters such that the last 30 characters overlap with other data displayed on the rendered fillable form 124. Regarding user birthday data example, the data may be stored as a two digit year, whereas the rendered fillable form 124 may display this as a four digit year. The developer 102 can create logic rules 106 within a ruleset 104 that appends a '19' for two digit year values above a year value of 25 or greater (e.g., 1925 or later), and appends a '20' for two-digit birth years below 25 (e.g., earlier than 2025). A constant 108 in this example may include a two-digit value for the state of a user's address. The flow 110 may specify that user addresses are to be accessed by an application programming interface (API) 116, while user birth years are to be retrieved from a database 118. The ruleset 104 created or modified by the developer 102 is reflected within a script file 112 that tells processing engine 114 which API(s) 116 and/or database(s) 118 as one or more data sources to access user address and date of birth information (i.e., stored data), along with instructions to apply the format rules from the ruleset 104 to this data. Once the processing engine 114 has retrieved the user's date of birth and address data, it provides this stored data to the data map file 120. In this embodiment, the processing engine 114 applies the ruleset 104 formatting rules to the stored data once it is retrieved, so that the changes in the ruleset 104 as to how the data is presented are then reflected in what is output to the data map file 120. The render engine 122 then utilizes this reformatted data, being applied to the tagged fillable fields corresponding to user date of birth and address, to output a rendered fillable form 124, now with a four digit user birth year and a user address capped at 40 characters. In other embodiments, some or all of the above-referenced formatting change examples to the fillable fields may be modifiable by the form creator 202 within the tagged fillable form 204.

Figure 3:
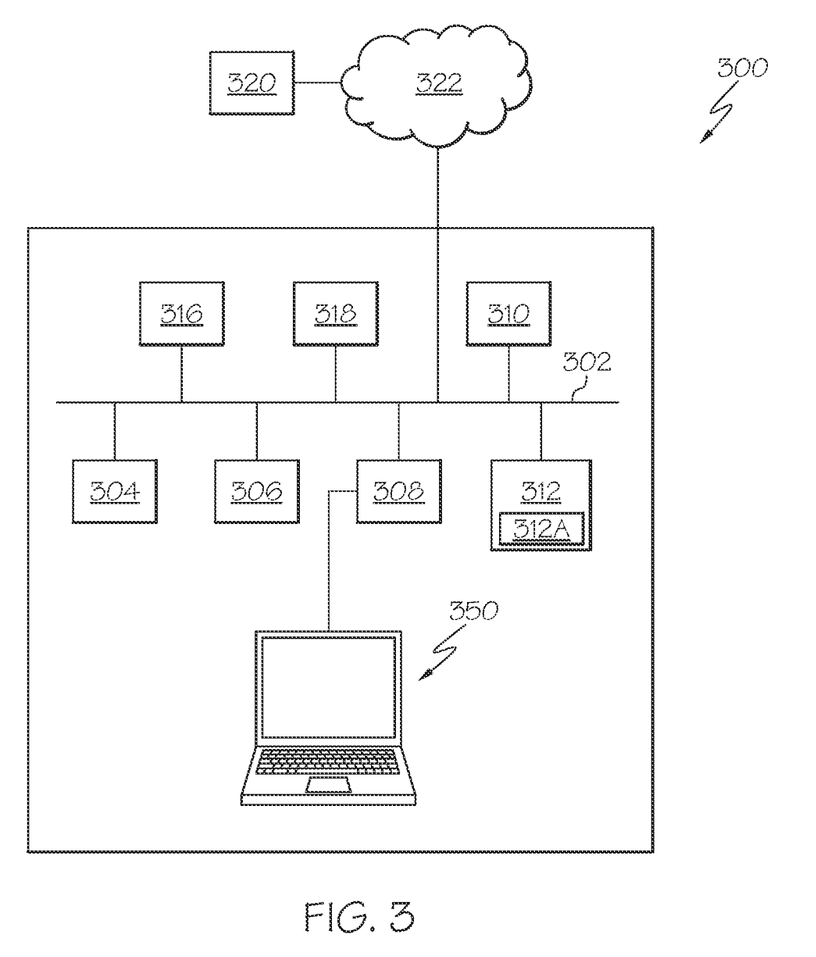
FIG. 3 depicts a computer system utilizing the developer process flow of FIG. 1 and/or the form creator process flow of FIG. 2, according to one or more embodiments shown and described herein.

FIG. 3 illustrates a compilationless fillable form modification system 300 for use with the developer flow 100 of FIG. 1, form creator flow 200, and other processes described herein, such as process 500 of FIG. 5 described in greater detail below. Referring to FIG. 3, a non-transitory, compilationless fillable form modification system 300 is configured for implementing a computer and software-based method, such as directed by the developer flow 100, the form creator flow 200, and the processes described herein, to utilize a dynamically fillable form rendering engine for compilationless modifications of tagged fillable forms. The compilationless fillable form modification system 300 includes a communication path 302, one or more processors 304, a non-transitory memory component 306, an input/output controller 308, a render engine 310, a processing engine 312, a training module 312A of the processing engine 312 (e.g., to train an artificial intelligence algorithm), a machine-learning module 316, network interface hardware 318, input/output controller 308, and input/output device(s) 350 (e.g., such as displays, point devices, touch screens, etc.). In some embodiments, the compilationless fillable form modification system 300 may include or be communicatively coupled to one or more remote servers 320 through a network 322. It is noted that systems according to the present disclosure may include a greater or fewer number of modules without departing from the scope of the present disclosure. The lines depicted in FIG. 3 indicate communication rather than physical connection between the various components.

An input/output device 350 of the compilationless fillable form modification system 300 may include a mobile smart device, a laptop computer, a desktop computer, server computer, or the like. In embodiments, components of the compilationless fillable form modification system 300 may include one or more input/output devices 350. As noted above, the compilationless fillable form modification system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the compilationless fillable form modification system 300. As used herein, the term "communicatively coupled" means that coupled components are capable of exchanging data signals with one another such as, for example, electrical signals via conductive medium, electromagnetic signals via air, optical signals via optical waveguides, and the like. Accordingly, communication may be facilitated through wired and/or wireless transmissions of data signals.

The compilationless fillable form modification system 300 of FIG. 3 also comprises as one or more processors the processor 304. The processor 304 can be any device capable of executing machine-readable instructions. Accordingly, the processor 304 may be a controller, an integrated circuit, a microchip, a computer, or any other computing device. The processor 304 is communicatively coupled to the other components of the form modification system 300 by the communication path 302. Accordingly, the communication path 302 may communicatively couple any number of processors 304 with one another, and allow the modules coupled to the communication path 302 to operate in a distributed computing environment. Specifically, each of the modules can operate as a node that may send and/or receive data.

The illustrated compilationless fillable form modification system 300 further comprises as one or more memory components communicatively coupled to the one or more processors 304 the memory component 306. The memory component 306 is coupled to the communication path 302 and communicatively coupled to the processor 304. The memory component 306 may be a non-transitory computer readable medium or non-transitory computer readable memory and may be configured as a nonvolatile computer readable medium. The memory component 306 may include RAM, ROM, flash memories, hard drives, or any device capable of storing machine-readable instructions such that the machine-readable instructions can be accessed and executed by the processor 304. The machine readable instructions stored in the one or more memory components 306 may cause the compilationless fillable form modification system to perform actions, processes, or methods as described herein. The machine-readable instructions may include logic or algorithm(s) written in any programming language such as, for example, machine language that may be directly executed by the processor 304, or assembly language, object-oriented programming (OOP), scripting languages, microcode, etc., that may be compiled or assembled into machine-readable instructions and stored on the memory component 306. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in computer programming languages, as pre-programmed hardware elements, or as a combination of hardware and software components.

The compilationless fillable form modification system 300 may include the processing engine 312 and the machine-learning module 316, as described above, communicatively coupled to the one or more processors 304. The training module 312A may be configured to apply artificial intelligence algorithms and models to received to determine a real-time adjuster priority score for each analyzed adjuster as described herein.

The processing engine 312 may include machine readable instructions stored in the one or more memory components 306 that cause the compilationless fillable form modification system 300 to perform actions, processes, or methods as described herein. The processing engine 312 may output a data map to a render engine 310, and each engine 312, 310 may be configured, and may include machine readable instructions stored in the one or more memory components 306 that cause upon execution the compilationless fillable form modification system 300, to perform actions, processes, or methods as described herein. The ruleset and/or stored data accessed via an API or stored in a database may be accessed via the network 322, such as via a communicatively coupled input/output device 350, or the like.

Referring again to FIG. 3, compilationless fillable the form modification system 300 includes the network interface hardware 318 for communicatively coupling the compilationless fillable form modification system 300 with a computer network such as network 322. The network interface hardware 318 is coupled to the communication path 302 such that the communication path 302 communicatively couples the network interface hardware 318 to other modules of the compilationless fillable form modification system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors 304, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 322 can include any wired and/or wireless network such as, for example, wide area networks, metropolitan area networks, the internet, an intranet, satellite networks, or the like. Accordingly, the network 322 can be utilized as an access point by the compilationless fillable form modification system 300 to access one or more servers 320. The one or more servers 320 may generally comprise processors, memory, and chipset for delivering resources via the network 322. Resources can include providing, for example, processing, storage, software, and information from the one or more servers 320 to the compilationless fillable form modification system 300 via the network 322. Additionally, it is noted that the one or more servers 320 and any additional servers 320 can share resources with one another over the network 322 such as, for example, via the wired portion of the network 322, the wireless portion of the network 322, or combinations thereof. In some examples, the one or more servers 320 may store, receive, or provide rulesets 104 (FIG. 1).

As noted above, the compilationless fillable form modification system 300 may include the input/output device(s) 350 for providing output and receiving input. For example, the input/output device(s) 350 may provide visual output such as, for example, information, graphical reports, messages, or a combination thereof. The input/output device(s) 350 may be coupled to input/output controller 308 which may comprise one or more of a data port, serial bus, local wireless controller, or the like. The input/output controller 308 may couple the input/output device(s) 350 to the communication path 302 such that the input/output device(s) 350 may be communicatively coupled to the processor 304. Accordingly, the communication path 302 communicatively couples the input/output device(s) 350 to other modules of the compilationless fillable form modification system 300. The input/output device(s) 350 can comprise a display comprising any medium capable of transmitting an optical output such as, for example, a cathode ray tube, light emitting diodes, a liquid crystal display, a plasma display, or the like.

As described herein, the processing engine 312 may implement the training module 312A via a neural network for natural language processing of the developer's input, thus descriptive language may fed into processing engine 312 (i.e., an AI-enabled processing engine). By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hiddenactivation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The compilationless Tillable form modification system 300 may utilize one or more ANN models as understood to those skilled in the art or as yet-to-be-developed to process natural language to be provided to processing engine, instead of the script file as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from natural language input to the processing engine and/or the data map, audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feedforward ANNs applied for adjuster assignment weights. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

The processing engine 312 may include the training module 312A which may process training data sets of scripting files to train one or more models to improve the datamap, optimize the scripting, and/or learn to put rendered forms together automatically. Training data sets stored and manipulated in the compilationless fillable form modification system 300 as described herein may be utilized by the machine-learning module 316, which is able to leverage, for example, a cloud computing-based network configuration to apply machine learning and artificial intelligence. This machine learning application may create models that can be applied by the compilationless fillable form modification system 300, to make it more efficient and intelligent in execution. As an example and not a limitation, the machine-learning module 316 may include artificial intelligence components selected from the group consisting of an artificial intelligence engine, Bayesian inference engine, and a decision-making engine, and may have an adaptive learning engine further comprising a deep neural network-learning engine. It is contemplated and within the scope of this disclosure that the term "deep" with respect to the deep neural network-learning engine is a term of art readily understood by one of ordinary skill in the art.

Figure 4:
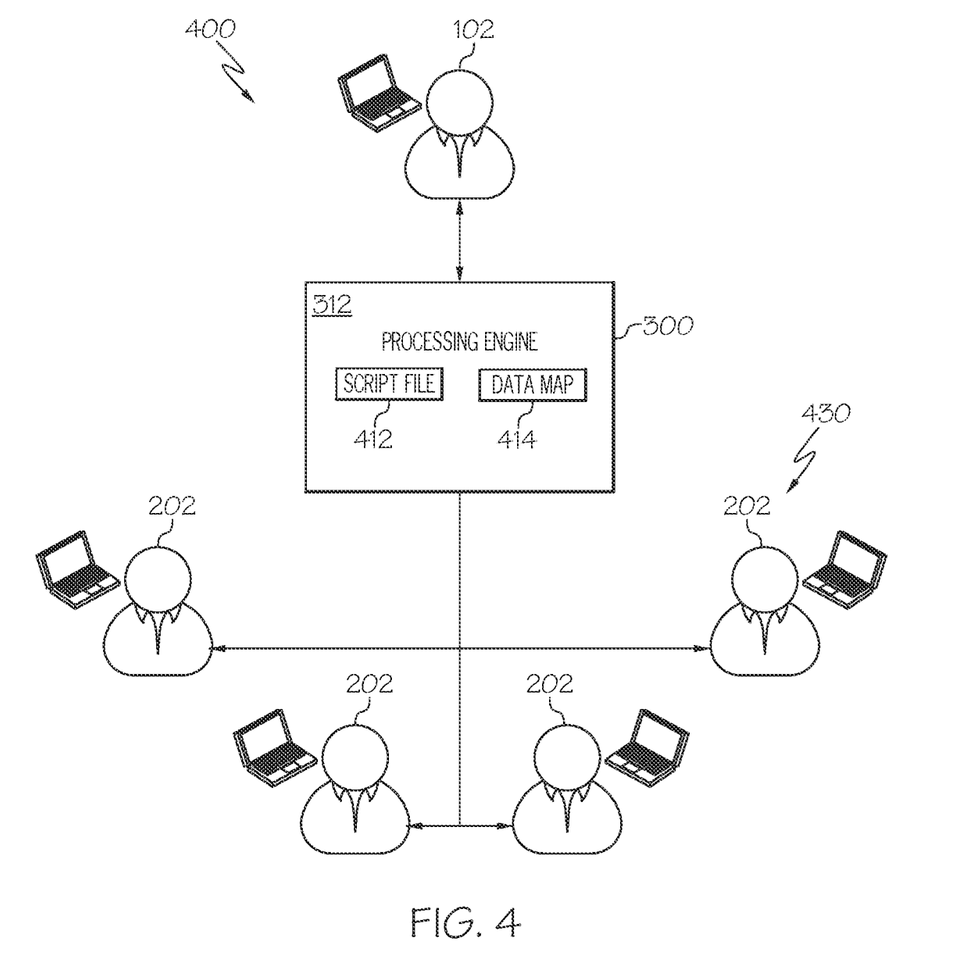
FIG. 4 depicts a schematic illustration of instances of the computer system as shown in FIG. 3, each utilizing the developer process flow of FIG. 1 or the form creator process flow of FIG. 2 within an operating environment, according to one or more embodiments shown and described herein.

Referring to FIG. 4, an operating environment 400 may include one or more developers 102 and one or more form creators 202 utilizing the compilationless fillable form modification system 300 depicted in FIG. 3. Developers 102 and form creators 202 may utilize computing devices, such as the input/output devices 350 of FIG. 3, or any other suitable user devices having a processor, such as a smartphone, laptop computer, wearable device, set-top box, desktop computer, tablet computer, or the like. Such a computing device may utilize the form modification system residing locally on the computing device, or may access the compilationless fillable form modification system 300 residing on a separate device, such as a server. Developers 102 and form creators 202 may utilize associated user accounts, which may be stored on a server (e.g., remote server 320) or may be otherwise accessed through a server or other storage location. User accounts may include attributes for a particular user and may include a unique identifier (ID) associated with the user, role (such as developer 102 or form creator 202) and associated access rights, personal settings, and the like.

In this embodiment, the user device of a developer 102 may communicate with the script file 412 within the processing engine, which, as discussed above, may receive a script file 412 as input and then output a data map 414. To generate a script file 412, a developer 102 may input a ruleset, which may then be transformed or otherwise form the basis of a script file 412. The processing engine 312 may then utilize the script file to access from various data sources (such as API's and/or databases), such that the data obtained from the data sources may be used to construct the data map 414. In some embodiments, the developer 102 may have permissions to view or otherwise access the processing engine 312, the script file 412, the data sources, the data map 414, and/or the render engine 310 that utilizes the data map as input to render a fillable form. In some embodiments, the scripting language may be stored in cache memory, such that the processing engine 312 may recognize an updated version of the script file 412. In some embodiments, a developer 102 or other role may be provided a graphical user interface (GUI) design view or a textual view of the scripting language. For example, a non-developer (such as a business user) could utilize the GUI to view the form (in fillable tagged form and/or rendered form) and visually edit graphical representations of the ruleset to produce the script file. In this embodiment, the data map 414, or a representation of it, may be made visible to the form creators 202, which may provide a deeper view of the data being utilized to populate the fillable fields specified and organized by a form creator 202. In other embodiments, a form creator 202 may have read or edit access to the processing engine 312, the script file 412, the data sources, the data map 414, and/or the render engine 310.

Figure 5:
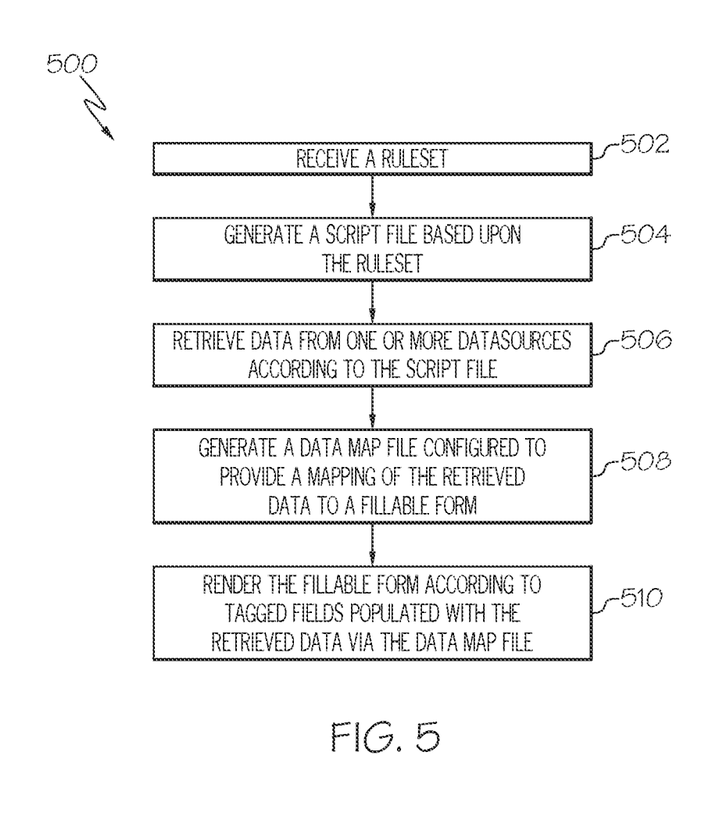
FIG. 5 depicts a flowchart process for use of the intelligent adjuster assignment solution of FIGS. 1-2 and the computer system of FIG. 3, according to one or more embodiments shown and described herein.

Referring now to FIG. 5, a process 500 is shown for use with the developer flow 100 of FIG. 1 and the form creator flow 200 of FIG. 2 and the compilationless fillable form modification system 300 as described herein to generate a script file that applies a ruleset to dynamically retrieve data for a generated data map file which maps data retrieved from data sources to tagged fields within a tagged fillable form to generate a modified rendering of the form. It is noted that a greater or fewer number of operations may be included without departing from the scope of the present disclosure. The machine readable instructions may cause the compilationless fillable form modification system 300 upon execution by the one or more processors 304 to receive a ruleset 104 comprising an update to a previous ruleset 104 associated with a compiled code and generate a script file 112 based upon the ruleset 104.

In this embodiment, at block 502 of the process, the compilationless fillable form modification system 300 (FIG. 3) may receive a ruleset comprising an update to a previous ruleset associated with a compiled code. As discussed above, the script file may be based upon a ruleset that includes logic, constants, and/or flow components. As a first example, a ruleset may specify a birthdate be formatted YYYYMMDD (4 digit year, 2 digit month, 2 digit day). This could be, for example, to change a U.S. formatted date of birth (MMDDYYYY) to a European formatted date (or vice versa in various embodiments). In a second example, a mailing address may be specified as having two lines for the street address portion of the mailing address (e.g., apartment or suite number). This may be accomplished, for example, by parsing a singular address line when certain words/abbreviations ('apartment', 'apt', 'suite', 'ste', and the like) are encountered.

At block 504 of the process 500, the compilationless fillable form modification system 300 (FIG. 3) may generate a script file based upon the ruleset. Continuing with the first example, the script file may specify that the birthdate is to be retrieved from one or more particular sources (e.g., database and/or API) in the specified format YYYYMMDD. Continuing with the second example, the script file may specify that the mailing address is to be retrieved from one or more particular sources (e.g., database and/or API) in the specified format of having two lines for the street address portion.

At block 506 of the process 500, the processing engine 114 (FIG. 1) may be configured to retrieve stored data from one or more data sources according to the script file. Continuing with the first example, the processing engine may receive the script file and retrieve the date of birth data in the format specified in the script file, which may differ from how it is expressed in the API or database. If a form was already created according to the embodiments herein, the data being retrieved may be output with different formatting (which can assist with debugging a rendered form that may need corrections to particular rendered fields or the rendered fillable form as a whole) and/or may have updated source value(s) in the respective database/API. Continuing with the second example, street level address data may be stored as a singular line (i.e., a street number, street name, apartment number). Based upon instructions provided by the script file, the processing engine may parse street level address data into two lines when encountering certain text that triggers parsing, as discussed at block 502.

At block 508 of the process 500, the processing engine 114 (FIG. 1) may be configured to generate a data map file configured to provide a mapping of the retrieved stored data to a fillable form based upon the script file and the retrieved stored data. Continuing with the first example, the date of birth data (in the form defined by the ruleset) is output to the data map file for use in a fillable form. Continuing with the second example, the full mailing address (including both lines of the street address as defined by the ruleset) is output to the data map file for use in a fillable form.

At block 510 of the process 500, the render engine 122 (FIG. 1) may be configured to render the fillable form according to tagged fields populated with the retrieved stored data via the data map file, such that the tagged fields correspond to fields in the data map file. Specifically, the data map may be provided to the rendering engine as input, along with tagged fillable fields as specified by a form creator within a fillable form associated with the data map. One or more fillable fields may be defined by the data map as referencing the data provided by the processing engine. Continuing with the first example, the form creator specifies a tagged birthdate field, which is defined in the data map as referring to the current data provided from the processing engine that pulled the data from the various data sources. Thus, even though the data may have been stored in a different format, the form creator can have the rendering engine populate the tagged birthdate field with the current data in the format specified according to the ruleset. Continuing with the second example, the form creator specifies a tagged address field, which is defined in the data map as referring to the current data provided from the processing engine that pulled the address data from the specified data source(s). The form creator may then have the rendering engine populate the tagged address field with the current data in the two-line street address format specified according to the ruleset. If the address does not render properly (i.e., the field text runs off the page, overlaps other text, improperly truncates, and the like), the ruleset can be quickly updated to try out a different ruleset for the particular data involved (such as the mailing address).

In embodiments, the compilationless fillable form modification system 300, the render engine 122, and the processing engine 114 to: (i) render, via the render engine 122, the fillable form 124 according to a tagged field whose contents exceed what can be visibly displayed in a rendered version of the tagged field; (ii) receive an updated ruleset 104; (iii) generate an updated script file 112 without recompiling the compiled code; (iv) receive the updated script file 112 at the processing engine 114; (v) render an updated form 124 at the render engine 122; and (vi) output an updated version of the fillable form 124 wherein the tagged field displays an entirety of the contents associated with the tagged field. The processing engine 114 may further be configured to retrieve updated stored data from the one or more data sources according to the script file 112 and generate an updated data map file 120 based upon the updated script file 112 and updated stored data. Additionally or alternatively, the compilationless fillable form modification system 300 may be configured to be trained to automatically create the data map file 120 utilizing descriptive language based upon machine learning.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of "at least one" component, element, etc., should not be used to create an inference that the alternative use of the articles "a" or "an" should be limited to a single component, element, etc. It is also noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present disclosure, it is noted that this term is an open-ended transitional term that is used to introduce a recitation of a series of characteristics of the structure and should be interpreted in like manner as the more commonly used open-ended preamble term "comprising."

ASPECTS LISTING

Aspect 1. A compilationless fillable form modification system includes one or more processors, one or more memory components communicatively coupled to the one or more processors, and machine readable instructions stored in the one or more memory components. The memory components cause the compilationless fillable form modification system to receive a ruleset comprising an update to a previous ruleset associated with a compiled code and generate a script file based upon the ruleset. The compilationless fillable form modification system includes a processing engine communicatively coupled to the one or more processors and the one or more memory components. The processing engine may be configured to receive the script file, retrieve stored data from one or more data sources according to the script file, and generate a data map file configured to provide a mapping of the retrieved stored data to a fillable form, based upon the script file and the retrieved stored data. The compilationless fillable form modification system also include a render engine communicatively coupled to the one or more processors and the one or more memory components. The render engine may be configured to access the data map file and render the fillable form according to tagged fields populated with the retrieved stored data via the data map file. The tagged fields correspond to fields in the data map file.

Aspect 2. The compilationless fillable form modification system of Aspect 1, wherein the ruleset comprises one or more of logic rules, constants, and flow rules.

Aspect 3. The compilationless fillable form modification system of any of Aspect 1 to Aspect 2, wherein the rendered fillable form is based upon the data map file, the one or more data sources, the script file, and the ruleset.

Aspect 4. The compilationless fillable form modification system of any of Aspect 1 to Aspect 3, further comprising machine readable instructions stored in the one or more memory components that cause the render engine to, at least, receive a tagged fillable form comprising the tagged fields, wherein the rendered fillable form is based upon the tagged fillable form, the data map file, the one or more data sources, the script file, and the ruleset.

Aspect 5. The compilationless fillable form modification system of Aspect 4, wherein the ruleset is received from a first user, and the tagged fillable form is received from a second user that differs from the first user.

Aspect 6. The compilationless fillable form modification system of any of Aspect 4 to Aspect 5, wherein the rendered fillable form is based upon the tagged fillable form, the data map file, the one or more data sources, the script file, and the ruleset.

Aspect 7. The compilationless fillable form modification system of any of Aspect 1 to Aspect 6, further including machine readable instructions stored in the one or more memory components that cause the processing engine to, at least, retrieve the stored data from at least one of an application programming interface and a database as the one or more data sources, and generate the data map file based upon applying the script file to the retrieved stored data.

Aspect 8. The compilationless fillable form modification system of Aspect 7, wherein the script file is a proprietary script file implemented in javascript object notation, the data map file is a proprietary data map file implemented in javascript object notation, and the stored data is from the application programming interface, wherein the application programming interface is a representational state transfer application programming interface.

Aspect 9. The compilationless fillable form modification system of any of Aspect 1 to Aspect 8, further comprising machine readable instructions stored in the one or more memory components that cause the compilationless fillable form modification system, the render engine, and the processing engine to, at least, render, via the render engine, the fillable form according to a tagged field whose contents exceed what can be visibly displayed in a rendered version of the tagged field. The compilationless fillable form modification system, the render engine, and the processing engine also receive an updated ruleset, generate an updated script file without recompiling the compiled code, receive the updated script file at the processing engine, render an updated form at the render engine, and output an updated version of the fillable form wherein the tagged field displays an entirety of the contents associated with the tagged field.

Aspect 10. The compilationless fillable form modification system of Aspect 9, further including machine readable instructions stored in the one or more memory components that cause the processing engine to, at least, retrieve updated stored data from the one or more data sources according to the script file, and generate an updated data map file based upon the updated script file and updated stored data.

Aspect 11. The compilationless fillable form modification system of any of Aspect 1 to Aspect 11, further including machine readable instructions stored in the one or more memory components that cause the compilationless fillable form modification system to, at least, train the compilationless fillable form modification system to automatically create a data map file utilizing descriptive language based upon machine learning.

Aspect 12. A compilationless fillable form modification system includes one or more processors, one or more memory components communicatively coupled to the one or more processors, and machine readable instructions stored in the one or more memory components. The memory components cause the compilationless fillable form modification system to receive a ruleset comprising an update to a previous ruleset associated with a compiled code and generate a script file based upon the ruleset. The compilationless fillable form modification system further includes a processing engine communicatively coupled to the one or more processors and the one or more memory components. The processing engine may be configured to receive the script file, retrieve stored data from one or more data sources according to the script file, and generate a data map file. The data map file provides a mapping of the retrieved stored data to a fillable form, based upon the script file and the retrieved stored data. The compilationless fillable form modification system further includes a render engine communicatively coupled to the one or more processors and the one or more memory components. The render engine is configured to access the data map file and receive a tagged fillable form comprising tagged fields, wherein the rendered fillable form is based upon the tagged fillable form, the data map file, the one or more data sources, the script file, and the ruleset. The render engine further is configured to renders the fillable form according to the tagged fields populated with the retrieved stored data via the data map file, wherein the tagged fields correspond to fields in the data map file, and wherein the rendered fillable form is based upon the data map file, the one or more data sources, the script file, and the ruleset.

Aspect 13. The compilationless fillable form modification system of Aspect 12, wherein the ruleset is received from a first user and the tagged fillable form is received from a second user that differs from the first user.

Aspect 14. The compilationless fillable form modification system of any of Aspect 12 to Aspect 13, wherein the rendered fillable form is further based upon the tagged fillable form.

Aspect 15. The compilationless fillable form modification system of any of Aspect 12 to Aspect 14, including machine readable instructions stored in the one or more memory components that cause the processing engine to, at least, retrieve the stored data from at least one of an application programming interface and a database as the one or more data sources and generate the data map file based upon applying the script file to the retrieved stored data.

Aspect 16. A compilationless modification of a fillable form method includes receiving a ruleset comprising an update to a previous ruleset associated with a compiled code, generating a script file based upon the ruleset, and retrieving data from one or more data sources according to the script file. The method further includes generating a data map file configured to provide a mapping of the retrieved stored data to the fillable form and rendering the fillable form according to tagged fields populated with the retrieved stored data via the data map file, wherein the tagged fields correspond to fields in the data map file.

Aspect 17. The method of Aspect 16, wherein the rendered fillable form is based upon the data map file, the one or more data sources, the script file, and the ruleset.

Aspect 18. The method of Aspect 17, further including receiving a tagged fillable form comprising the tagged fields, wherein the rendered fillable form is based upon the tagged fillable form, the data map file, the one or more data sources, the script file, and the ruleset.

Aspect 19. The method of any of Aspect 18, wherein the ruleset is received from a first user and the tagged fillable form is received from a second user that differs from the first user.

Aspect 20. The method of any of Aspect 16 to Aspect 19, further including retrieving the stored data from at least one of an application programming interface and a database as the one or more data sources and generating the data map file based upon applying the script file to the retrieved stored data.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A compilationless fillable form modification system comprising:
   one or more processors;
   one or more memory components communicatively coupled to the one or more processors;
   machine readable instructions stored in the one or more memory components that cause the compilationless fillable form modification system to perform at least the following when executed by the one or more processors:
   receive an updated ruleset, the ruleset comprising an update to a previous ruleset associated with a compiled code previously used to generate a fillable form, wherein the update comprises a format rules update, a stored data update, and a mapping of the updated stored data to the fillable form;
   generate a script file based upon the updated ruleset without recompiling the compiled code, wherein the script file is a proprietary script file implemented in javascript object notation (JSON);
   a processing engine communicatively coupled to the one or more processors and the one or more memory components, configured to perform at least the following:
   receive the script file;
   retrieve the updated stored data from one or more data sources according to the script file; and
   generate a data map file configured to provide the mapping of the retrieved stored data to the fillable form based upon the script file and the retrieved stored data, wherein the data map file is a proprietary data map file implemented in JSON; and
   a render engine communicatively coupled to the one or more processors and the one or more memory components, configured to perform at least the following:
   access the data map file; and
   render the fillable form to generate a rendered fillable form as an update of the fillable form according to fillable fields tagged within the fillable form as tagged fields to be filled with the retrieved stored data, wherein the rendered fillable form is based upon the fillable form, the data map file, the one or more data sources, the script file, and the updated ruleset, the tagged fields populated with the retrieved stored data via the data map file, wherein the tagged fields correspond to fields in the data map file generated based on the script file.

2. The compilationless fillable form modification system of claim 1, wherein the ruleset comprises one or more of:
   logic rules;
   constants; and
   flow rules.

3. The compilationless fillable form modification system of claim 1, wherein:
   the updated ruleset is received from a first user; and
   the fillable form is received from a second user that differs from the first user.

4. The compilationless fillable form modification system of claim 1, further comprising machine readable instructions stored in the one or more memory components that cause the processing engine to perform at least the following when executed by the one or more processors:
   retrieve the updated stored data from at least one of an application programming interface and a database as the one or more data sources; and
   generate the data map file based upon applying the script file to the retrieved stored data.

5. The compilationless fillable form modification system of claim 4, wherein:
   the retrieved stored data is from the application programming interface, wherein the application programming interface is a representational state transfer application programming interface.

6. The compilationless fillable form modification system of claim 1, further comprising machine readable instructions stored in the one or more memory components that cause the compilationless fillable form modification system, the render engine, and the processing engine to perform at least the following when executed by the one or more processors:

render, via the render engine, the fillable form to generate the rendered fillable form according to a tagged field whose contents exceed what can be visibly displayed in a rendered version of the tagged field;

receive a further updated ruleset;

generate an updated script file without recompiling the compiled code;

receive the updated script file at the processing engine;

render an updated form at the render engine; and output an updated version of the fillable form wherein the tagged field displays an entirety of the contents associated with the tagged field.

7. The compilationless fillable form modification system of claim 6, further comprising machine readable instructions stored in the one or more memory components that cause the processing engine to perform at least the following when executed by the one or more processors:

retrieve the updated stored data from the one or more data sources according to the updated script file; and generate an updated data map file based upon the updated script file and the updated stored data.

8. The compilationless fillable form modification system of claim 1, further comprising machine readable instructions stored in the one or more memory components that cause the compilationless fillable form modification system to perform at least the following when executed by the one or more processors:

train the compilationless fillable form modification system to automatically create the data map file utilizing descriptive language based upon machine learning.

9. A method of compilationless modification of a fillable form, the method comprising:

receiving an updated ruleset comprising an update to a previous ruleset associated with a compiled code previously used to generate a fillable form, wherein the update comprises a format rules update, a stored data update, and a mapping of the updated stored data to the fillable form;

generating a script file based upon the updated ruleset without recompiling the compiled code, wherein the script file is a proprietary script file implemented in javascript object notation (JSON);

retrieving the updated stored data from one or more data sources according to the script file;

generating a data map file configured to provide the mapping of the retrieved stored data to the fillable form based upon the script file and the retrieved stored data, wherein the data map file is a proprietary data map file implemented in JSON; and rendering the fillable form to generate a rendered fillable form as an update of the fillable form according to fillable fields tagged within the fillable form as tagged fields to be filled with the retrieved stored data, wherein the rendered fillable form is based upon the fillable form, the data map file, the one or more data sources, the script file, and the updated ruleset, wherein the tagged fields correspond to fields in the data map file generated based on the script file.

10. The method of claim 9, wherein:

the updated ruleset is received from a first user; and the fillable form is received from a second user that differs from the first user.

11. The method of claim 9, further comprising:

retrieving the updated stored data from at least one of an application programming interface and a database as the one or more data sources; and generating the data map file based upon applying the script file to the retrieved stored data.

\* \* \* \* \*